Jan. 11, 1966  A. FLECK ETAL  3,228,483
TRACTOR DRIVEN OBSTACLE-AVOIDING AGRICULTURAL IMPLEMENT
Filed Jan. 18, 1963  8 Sheets-Sheet 1

ALFONS FLECK
RUDOLF HABISREUTHER
HERBERT HALLER
INVENTORS.

BY J. L. Kollin

Jan. 11, 1966   A. FLECK ETAL   3,228,483
TRACTOR DRIVEN OBSTACLE-AVOIDING AGRICULTURAL IMPLEMENT
Filed Jan. 18, 1963   8 Sheets-Sheet 3

ALFONS FLECK
RUDOLF HABISREUTHER
HERBERT HALLER
            INVENTORS.

BY J. L. Kollin

Jan. 11, 1966 A. FLECK ETAL 3,228,483
TRACTOR DRIVEN OBSTACLE-AVOIDING AGRICULTURAL IMPLEMENT
Filed Jan. 18, 1963 8 Sheets-Sheet 5

ALFONS FLECK
RUDOLF HABSREUTHER
HERBERT HALLER
INVENTORS.

BY J. L. Kellin

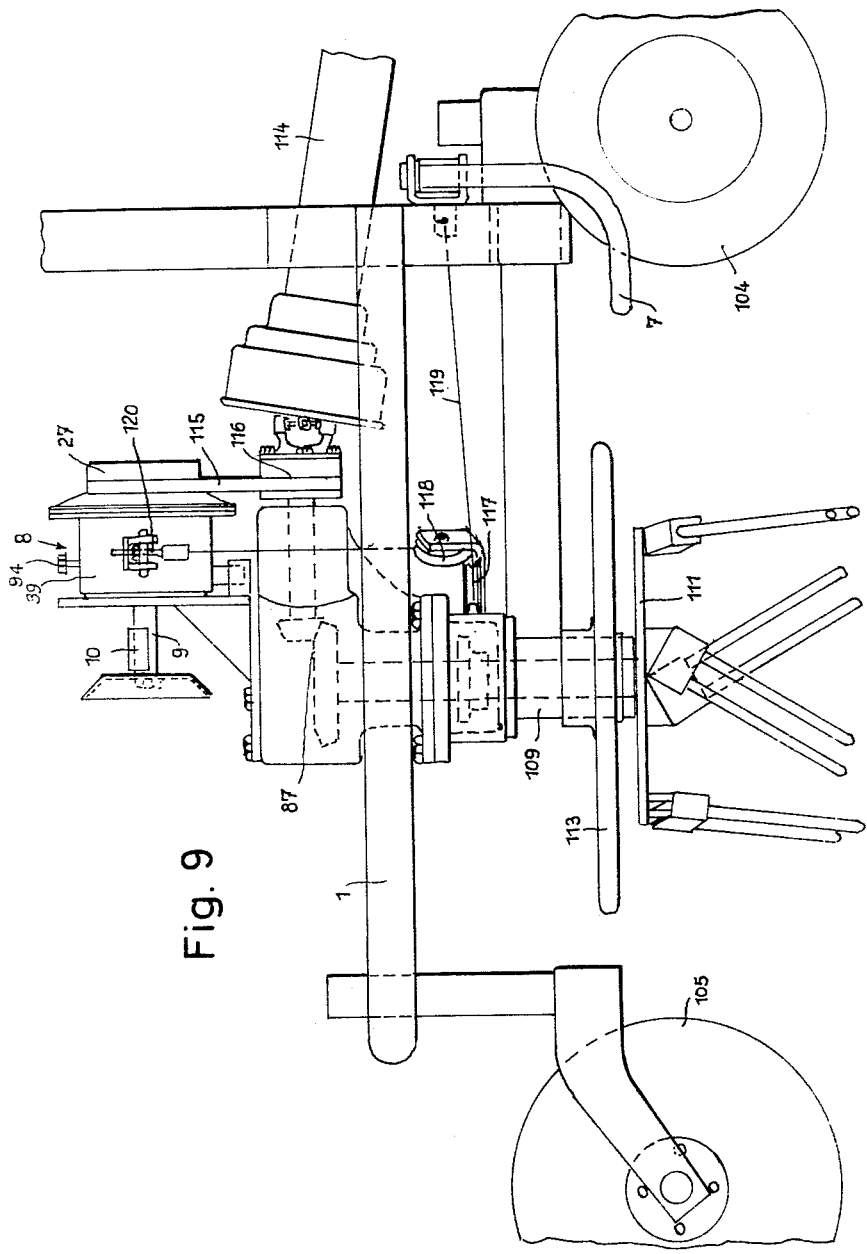

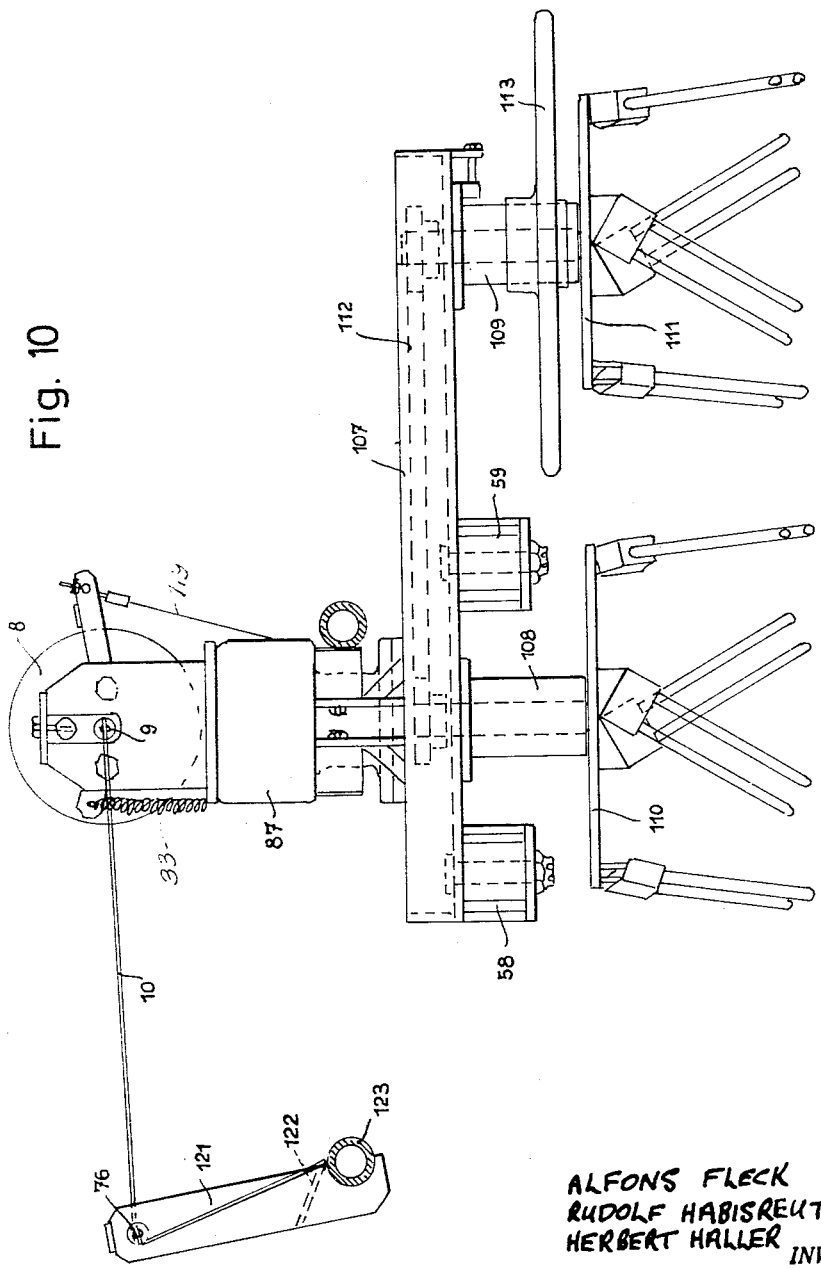

United States Patent Office 3,228,483
Patented Jan. 11, 1966

3,228,483
TRACTOR DRIVEN OBSTACLE-AVOIDING
AGRICULTURAL IMPLEMENT
Alfons Fleck, 6 Hauptstrasse, Bermatingen, Kreis Ueberlingen, Germany, and Rudolf Habisreuther, 4 Hahnstrasse, and Herbert Haller, 14 Bussenstrasse, both of Markdorf, Baden, Germany
Filed Jan. 18, 1963, Ser. No. 252,452
Claims priority, application Germany, Dec. 5, 1962,
M 55,018
2 Claims. (Cl. 172—38)

The present invention concerns a tractor driven apparatus for mowing, hoeing, ploughing or the like in plantations having at least one implement adapted to be hinged inwardly when it strikes an obstacle, more especially against a tree, shrub or vine in which a feeler lever is pivoted when striking against an obstacle to close a clutch between the drive from the tractor and a reeling shaft, which by winding up a tractive cable-like member fixedly arranged at one end, causes a swivel arm supporting the working implement to be swung inwardly.

It has been proved that such an apparatus, suitably modified, permits a large variety of cultivation possibilities and more especially simplifies cultivation in vineyards. Owing to the small space between the rows in vineyards it is necessary for the inward swinging movement to take place in a small space and conveniently in the direction of travel, so that the working implement, e.g. a plough share, maintains its direction of travel even in the in-swing position.

This is obtained by the fact that the pivot arm supporting the clutch, having a feeler lever and reeling shaft, is constructed in the form of parallelogram guide bars. The parallelogram guide bars are expediently fixedly mounted on a lateral strut of the chassis, whilst its end disposed in the direction of travel is so mounted on a bar supporting the feeler lever and the implement, that it is adapted to be swung inwardly in the direction of the chassis by means of the reeling device.

To enable the feeler lever to operate particularly readily, the latter conveniently does not influence the clutch directly but by means of several guide rods supplying the required power transmission. To improve the power transmission between the reeling shaft and the guide bar and adapted to be swung inwardly, a cable is passed over a guide roller fixedly mounted on the chassis.

To obtain a still more compact style for constricted space conditions, more especially in vineyards having a small spacing between rows and to enable an intensive mechanical cultivation, thus also between the individual vines without them being damaged by the implement, one or more implements connected by a chain drive together with a bellcrank drive and the clutch are accommodated on a bar on the free end of the parallelogram guide rod system and clutch, the implement being adapted to be driven from the power takeoff shaft of the tractor via a cardan shaft.

When engaging the clutch by the feeler lever of the parallelogram guide rods, the implement and the clutch are swung inwardly in the direction of the chassis. The feeler lever itself may be mounted on the vehicle frame and the clutch engaged thereby via a cable, so that ready operation is ensured with a suitable transmission ratio.

The implement itself is advantageously driven via a bevel gear drive and chain drive 1 in such a direction of rotation that the swinging back movement of the implement is assisted and thereby the return spring selected to be weaker.

The invention will now be described further, by way of example, with reference to the accompanying drawings, in which:

FIG. 9 is a side view on an enlarged scale; and

FIG. 10 is a rear view on an enlarged scale taken on the line II—II of FIG. 8.

Figure 1:
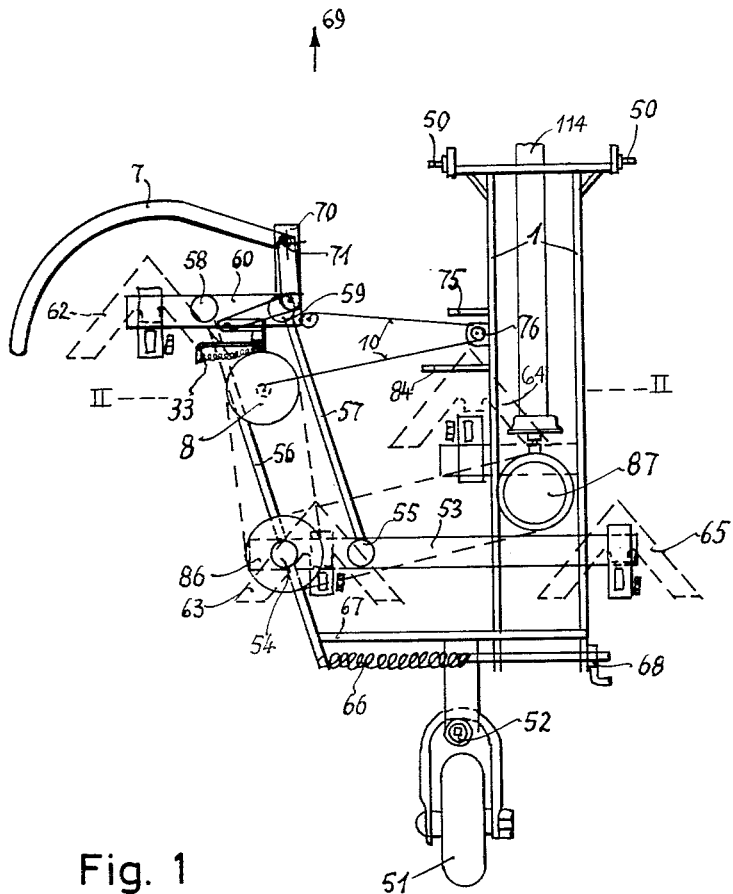
FIG. 1 is a schematic plan of an apparatus, constructed in accordance with the invention, adapted to be swung inwardly in the direction of travel and equipped with three fixed plough shares.
Figure 2:
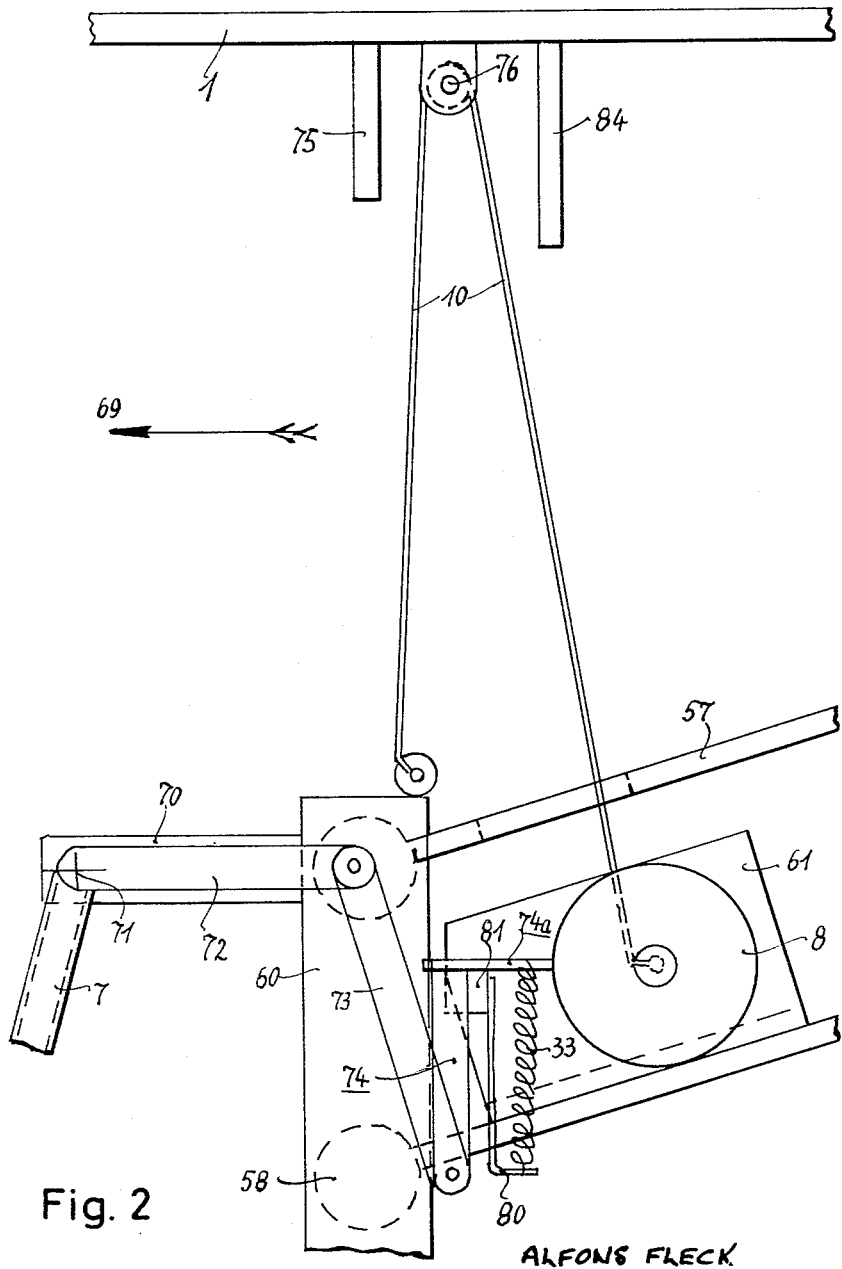
FIG. 2 is a fragmentary view of FIG. 1 on an enlarged scale.

Fixed pivots 54, 55 of two parallelogram guide rods 56, 57 are arranged on a cantilever arm 53 provided on a chassis 1 which is adapted to be attached to a hydraulic power jack of a tractor by means of bolts 50, for example, and having a trailing wheel 51, adapted to be swivelled in all directions, a bearing 52 of which is vertically adjustable for varying the working depth. Front pivots 58, 59 of the guide rods 56, 57 are mounted on a bar 60 which, by means of a bracket 61, supports a clutch 8 and a reeling shaft 9. The bar 60 moreover serves to receive the implement adapted to be swung inwardly and possibly also a rotary drive thereof. In the embodiment shown in FIG. 1 a draw hoe or plough share 62 is the implement provided. Fixed draw hoes or plough shares 63, 64, 65 are suitably distributed on the chassis in accordance with the working width of the device.

The parallelogram guide rod 56 is extended beyond its fixed pivot 54 and is adapted to be drawn against a stop 67 by means of a strong return spring 66. The force of the spring 66 is adapted to be regulated by means of an adjusting screw 68 provided on the chassis 1.

In the example shown, the implement 62 travelling between rows of trees, for example, is swung inwardly to the right of FIG. 1 towards the chassis 1 and thus in the direction of travel, which is indicated by means of an arrow 69, as soon as the feeler lever 7 strikes against a tree, shrub or other obstacle and thereby is swung somewhat anticlockwise. The feeler lever 7 is mounted at 71 on an extension bar 70 of the bar 60 so as to be rotatable, and is connected with a bellcrank lever 74 by means of guide rods 72 and 73, the bellcrank lever 74 being rigidly connected with a screw sleeve 18 of the clutch 8.

Closing of the clutch 8 causes the reeling shaft 9 mounted therein to be driven by motor power and via a cable 10 causes the inward swinging of the parallelogram guide rods 56, 57 until the bar 60 strikes against a stop 75 on the chassis 1. To increase the speed of the inward swinging movement, the cable 10 preferably made of a band of synthetic fibre fabric is passed over a guide roller 76 fixedly mounted on the chassis 1, one end of it being secured by means of a loop through a slot 77 in the reeling shaft 9 on a pin 79 held by a nut 78, the other end being secured to the bar 60 of the parallelogram guide rods 56 and 57.

The feeler lever 7 is returned, as soon as it has cleared the obstacle, by means of a spring 33 which is connected with the bellcrank lever 74 of the coupling device 8 and with one end of an angle 80 fixed on the bracket 61, a free end 81 of the angle serving as a stop for a limb 74a of the bellcrank lever 74.

If the feeler lever 7 strikes an obstacle at high speed near to its pivot 71, then the return spring 33 may no longer be able or not quickly enough be able to open the clutch 8. This is then effected by the limb 74a striking against a stop 84 on the chassis 1 as soon as the bar 60 of the parallelogram guide rods strikes against the end stop 75 on the chassis.

The pulley 27 of the clutch 8 is driven via a transmission gearing 86 and a bevel gear 87 from the power takeoff shaft of the tractor.

Figure 4:
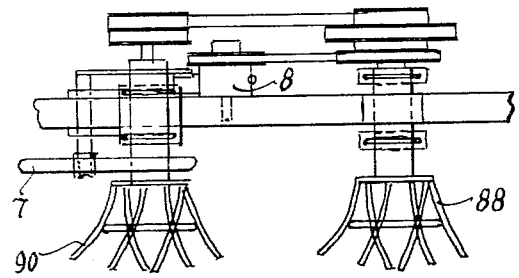
FIG. 4 is a side view corresponding to FIG. 3.
Figure 3:
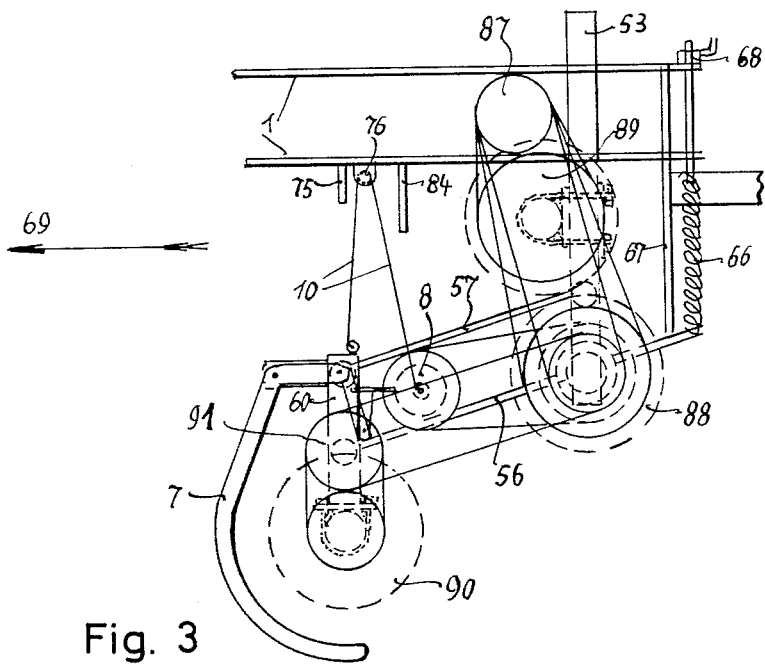
FIG. 3 is a plan view corresponding to FIG. 1 showing the driving means for the rotary implements.
Figure 5:
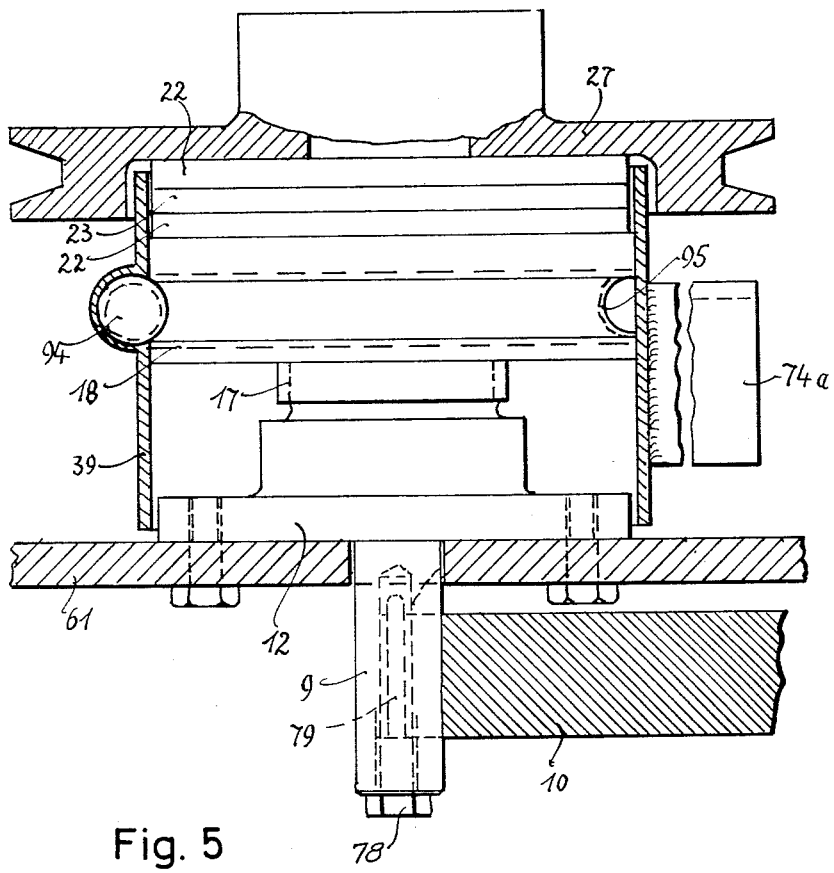
FIG. 5 is a cross-section on line II—II of FIG. 8 through the clutch and reeling shaft.
Figures 6, 7:
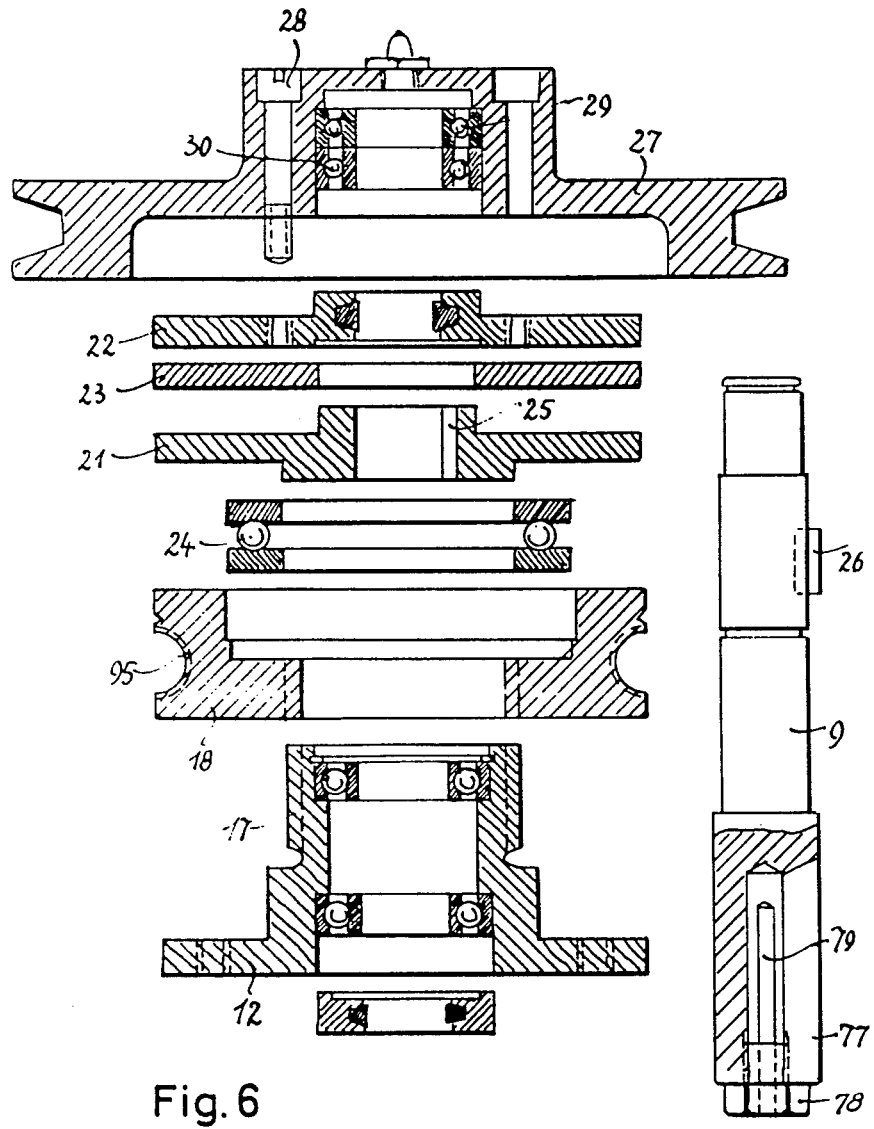
FIG. 6 is an exploded view of the individual parts of the clutch.
FIG. 7 is an elevation, partly in section, of the reeling shaft.

When using rotating implements, such as rotary cultivating, hoeing or mowing implements, their drive is also taken from bevel gear 87. The bearings of fixedly arranged implements 88 and 89 (FIGS. 3 and 4) are screwed firmly on the cantilever arm 53 and the bearing of the pivotally mounted implement 90 on the bar 60 of the parallelogram guide rods; the drive is effected in each case via pulleys. The pivotal implement 90 is thus driven via an intermediate pulley 91 in order to increase the lateral free space.

The clutch 8 has a fixing flange 12 which is mounted by means of screws 13 on the bracket 61 of the parallelogram guide rods. On the outside the flange 12 is provided with a thread 17 serving to receive a threaded sleeve 18, on which the bellcrank lever 74, 74a is fixed which is connected with the feeler lever 7 by means of the guide rods 72 and 73.

When the feeler level 7 strikes against an obstacle it is forced back and thereby the threaded sleeve 18 slightly turned, thereby causing the plate clutch to close. This plate clutch comprises two clutch halves 21 and 22 between which is arranged a clutch plate 23. The lower clutch half 21 is supported by a thrust bearing 24 which is accommodated in a recess of the threaded sleeve 18. The bore of the lower clutch half 21 has a groove 25 in which engages a wedge-shaped driver 26 of the reeling shaft 9.

The upper clutch half 22 is accommodated in a recess in a pulley 27 and secured thereto by means of bolts 28. The pulley 27 is constantly driven by the tractor by way of a V-belt and supports two ball bearings 29 and 30, which take over the upper mounting of the reeling shaft 16.

Thus, if on striking against a tree, the threaded sleeve 18 is slightly turned by the feeler lever 7, then it suffices to close the plate clutch 21, 22 and 23, whereby the drive of the pulley 27 is transmitted to the reeling shaft 9.

Consequently the free end of the haulage member 10 fixed on the reeling shaft 9 is wound thereon and thereby displaces the parallelogram guide rod into its swivel position until the feeler lever 7 is clear of the obstacle again, thereby causing the threaded sleeve 18 to be turned in reverse and the clutch 21, 22 and 23 disengaged again. This causes the reeling shaft 9 to be disengaged from the driving disc 27, so that the strong return spring 66 is able to return the parallelogram guide rod at considerable speed into its swung out position in which the extension of the guide rod 56 abuts against the stop.

A worm 94 is used for adjusting the coupling moment which worm 94 protrudes from a cylindrical dust guard 39 and is adapted to cooperate with a toothing 95 formed on the circumference of the threaded sleeve 18.

Figure 8:
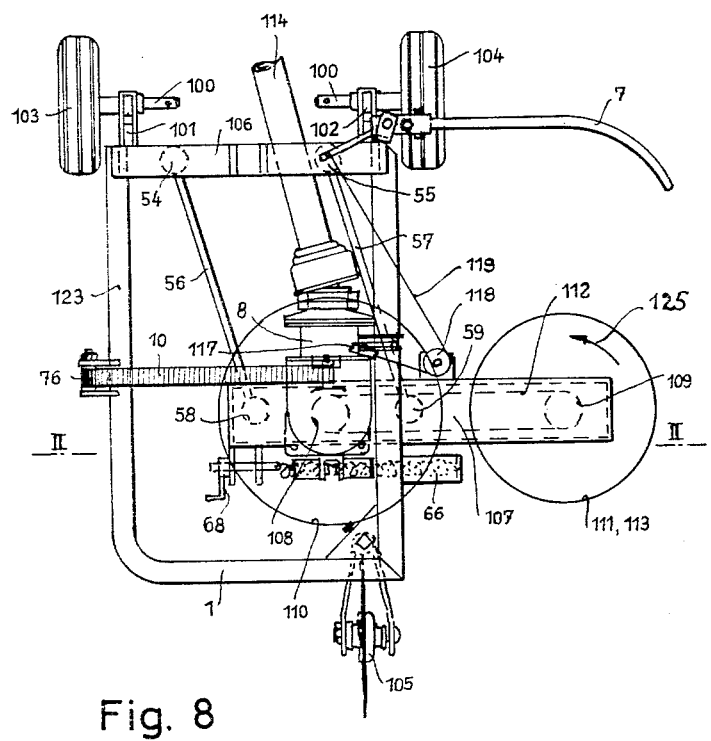
FIG. 8 is a schematic plan view of a modified embodiment of apparatus constructed in accordance with the invention.

In the example of FIGS. 8 to 10, the chassis 1 at the front end has two running wheels 103 and 104 rigidly mounted by means of two axle journals 100 but is adapted to be vertically adjustable, furthermore at the rear end a running wheel or a plough disc 105, which is adapted to be laterally pivotal and also vertically adjustable.

The fixed pivots 54 and 55 of the two parallelogram guide rods 56, 57 are arranged on a front crossbar 106 of the chassis 1. The displaceable pivots 58 and 59 are situated at the rear in the direction of travel, thus on a bar 107, also supporting bearings 108 and 109 for the two rotating implements 110 and 111, for example mowing cutters, radial hoes etc. which are coupled by means of a chain drive 112. A rubber-padded guard hoop 113 is mounted over the externally disposed implement 111.

A bevel gear drive 87, which is driven by a cardan shaft 114 connected to the power takeoff shaft of the tractor is provided moreover above the inner implement 110. The bevel gear drive simultaneously reduces the speed of the cardan shaft to the substantially lower speed of the implements 110 and 111.

The automatic clutch 8 is so provided above the bevel gear drive 87, though horizontally, that its pulley 27 is constantly driven via a belt drive 115 by a disc 116 provided between the cardan shaft 114 and the bellcrank drive 87. The clutch is engaged when the feeler lever 7, now mounted on the front part of the chassis 1, operates, via a cable 119 passed over guide rollers 117 and 118, which cable is connected with the threaded sleeve 18 of the clutch 8 so as to be adjustable by means of a thread or split pin 120. Adjustment of the coupling moment is effected by means of the worm 94. The cable 10 of the clutch emanating from the reeling shaft 9, as in the first embodiment, is passed over a guide roller 76 which is mounted on a lateral support 121 on the chassis 1 together with a free end 122 of the cable 10. The method of operation of the clutch 8 corresponds to that of the first embodiment. When the clutch 8 operates, the parallelogram guide rods 56 and 57 with the bar 107 and the parts mounted thereon is now displaced by the reeling shaft 9 and the cable 10 towards the interior of the vehicle frame 1 (to the left in FIG. 8) until striking against a left hand stringer 123 of the vehicle frame 1 or against a stop mounted thereon, so that the outwardly disposed implement 111 is clear of the obstacle.

The parallelogram guide rods 56 and 57 and the implements 110 and 111 are returned again by means of a return spring 66, the tension of which is adjustable by means of a screw 68.

We claim:

1. In an obstacle-avoiding agricultural implement adapted to be pivotally mounted to a tractor, a chassis including, a substantially rectangular wheel mounted frame structure, a pair of substantially parallel guide rods each pivotally connected to said frame structure and extending substantially rearwardly, a transversely extending implement carrier bar pivotally connected to said guide rods, a horizontal longitudinally extending reeling shaft rotatably mounted on said carrier bar, drive means on said carrier bar for said reeling shaft, normally disengaged clutch means in said drive means, a pivotally mounted feeler lever on said frame structure and extending laterally from said frame structure; means interconnecting said feeler lever and said clutch means, said interconnecting means including a cable passed over a pair of guide rollers on said carrier bar, said feeler lever thereby engaging said clutch means upon encountering an obstacle, spring means extending between said carrier bar and said frame structure, adjusting means on said carrier bar for regulating the tension in said spring means, a flexible tension element connected to said frame structure and windable on said reeling shaft to displace said implement carrier bar pivotally on said guide rods into a retracted position against the action of said spring means on engagement of the clutch means, a plurality of implements rotatably mounted on said carrier bar, implement drive means interconnecting said implements and said first mentioned drive means, said first mentioned drive means being connected to the power takeoff of the tractor.

2. The device according to claim 1, in which the guide rods with the implement and clutch are adapted to be swung inwardly toward the tractor when the clutch is engaged by the feeler lever.

References Cited by the Examiner

UNITED STATES PATENTS 2,489,633  11/1949  Fulgham _____ 172—5

FOREIGN PATENTS

| | | |
|---|---|---|
| 63,790 | 7/1945 | Denmark. |
| 967,179 | 3/1950 | France. |
| 1,033,371 | 4/1953 | France. |
| 1,094,879 | 12/1954 | France. |
| 1,208,929 | 9/1959 | France. |
| 1,223,046 | 1/1960 | France. |
| 1,243,247 | 8/1960 | France. |

ABRAHAM G. STONE, *Primary Examiner.*